United States Patent
Fida

(10) Patent No.: US 10,252,593 B2
(45) Date of Patent: Apr. 9, 2019

(54) VEHICLE ATTITUDE MODIFICATION

(71) Applicant: Toyota Motor Engineering & Manufacturing North America, Inc., Erlanger, KY (US)

(72) Inventor: Andrew E. Fida, Sun City, AZ (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 151 days.

(21) Appl. No.: 15/367,612

(22) Filed: Dec. 2, 2016

(65) Prior Publication Data

US 2018/0154726 A1 Jun. 7, 2018

(51) Int. Cl.
*B60G 17/017* (2006.01)

(52) U.S. Cl.
CPC ........ *B60G 17/017* (2013.01); *B60G 2300/02* (2013.01); *B60G 2300/04* (2013.01); *B60G 2400/051* (2013.01); *B60G 2400/0512* (2013.01); *B60G 2400/302* (2013.01); *B60G 2400/304* (2013.01); *B60G 2400/39* (2013.01); *B60G 2400/97* (2013.01); *B60G 2400/972* (2013.01); *B60G 2500/322* (2013.01); *B60G 2500/324* (2013.01); *B60G 2800/01* (2013.01); *B60G 2800/014* (2013.01); *B60G 2800/20* (2013.01); *B60G 2800/205* (2013.01); *B60Y 2300/28* (2013.01); *B60Y 2400/3015* (2013.01); *B60Y 2400/3017* (2013.01); *B60Y 2400/92* (2013.01)

(58) Field of Classification Search
CPC .............. B60G 17/017; B60G 2300/02; B60G 2300/04; B60G 2300/051; B60G 2300/0512; B60G 2300/302; B60G 2300/304; B60G 2300/39; B60G 2300/97; B60G 2300/972; B60G 2300/322
USPC .......................................................... 701/37
See application file for complete search history.

(56) References Cited

U.S. PATENT DOCUMENTS

| 5,273,308 | A | 12/1993 | Griffiths |
| 5,857,825 | A | 1/1999 | Rice |
| 6,155,588 | A | 12/2000 | Maxey |
| 6,431,557 | B1 | 8/2002 | Terborn et al. |
| 6,461,096 | B1 | 10/2002 | Mentele et al. |

(Continued)

OTHER PUBLICATIONS

Tilt-A-Hitch, Retrieved from the Internet: <http://www.tiltahitch.com/learn-more-about-our-hitch-here-tilt-a-hitch>, Retrieved Sep. 15, 2016, 4 pages.

*Primary Examiner* — Krishnan Ramesh
(74) *Attorney, Agent, or Firm* — Christopher G. Darrow; Darrow Mustafa PC

(57) ABSTRACT

Systems and methods for modifying an attitude of a vehicle are disclosed. A user selects a trailer mode for a vehicle body. The selected trailer mode has a corresponding configuration. The vehicle determines one or more features about a trailer based on the selected trailer mode. The vehicle determines a location of a trailer hitch needed to achieve the configuration corresponding to the selected trailer mode. The location is based on the one or more features about the trailer. The vehicle actuates at least one active component in the vehicle's active suspension system to change the attitude of the vehicle body so as to cause the trailer hitch to be located in the determined location thereby causing the vehicle body to be in the selected trailer mode.

20 Claims, 8 Drawing Sheets

(56) References Cited

U.S. PATENT DOCUMENTS

| | | |
|---|---|---|
| 8,172,237 B2 | 5/2012 | Peterson |
| 9,352,678 B1 | 5/2016 | Weldy |
| 9,421,843 B2 | 8/2016 | Kim et al. |
| 2006/0187008 A1* | 8/2006 | Yu .......................... B60D 1/58 340/431 |
| 2006/0206253 A1* | 9/2006 | Yu ........................ B62D 6/002 701/70 |
| 2008/0179916 A1* | 7/2008 | Breakfield ........... B62D 35/001 296/180.4 |
| 2009/0123260 A1 | 5/2009 | Howard-Leicester |
| 2011/0181006 A1* | 7/2011 | Heppner ................ B60G 11/04 280/9 |
| 2016/0129749 A1 | 5/2016 | Selden et al. |

* cited by examiner

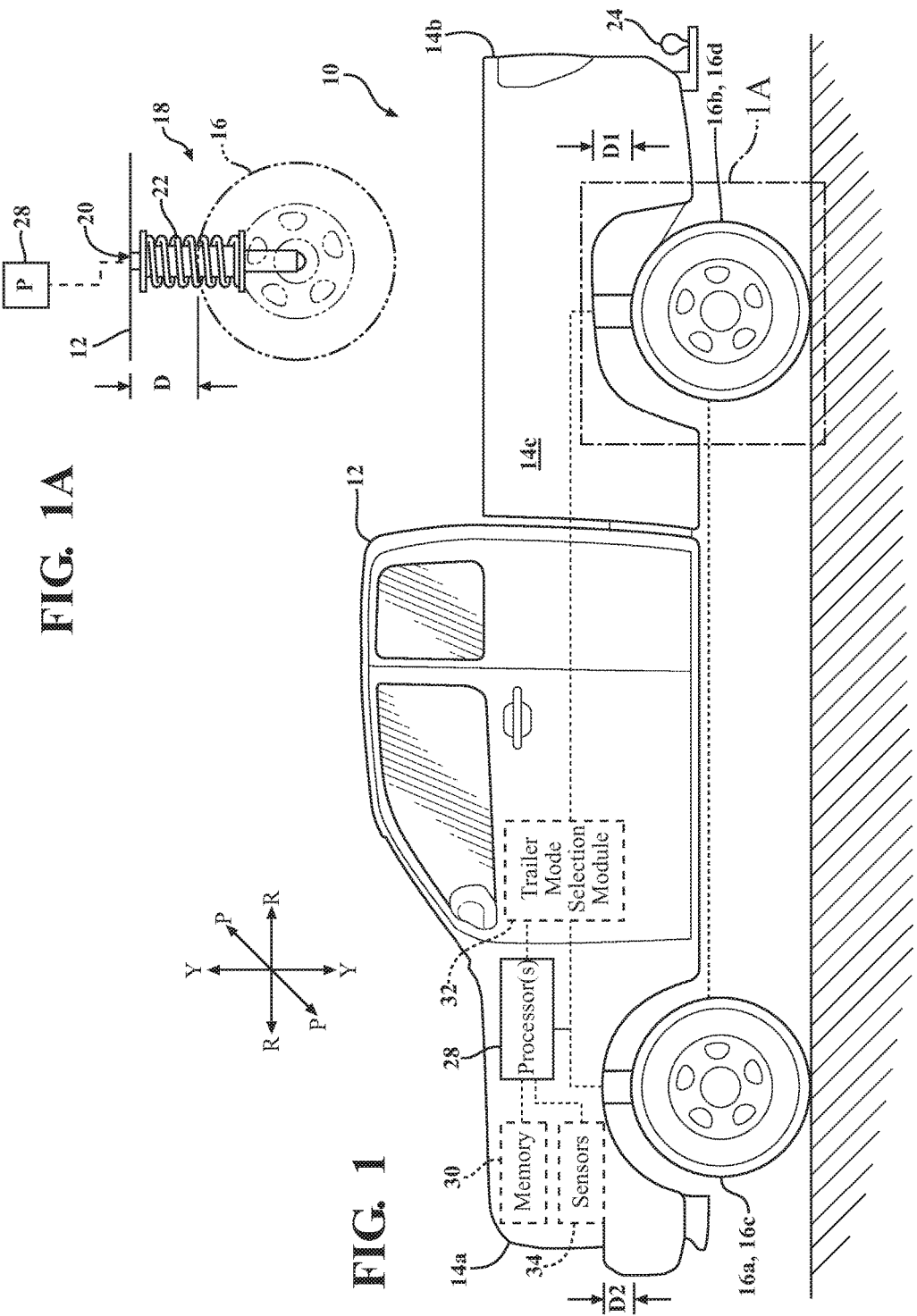

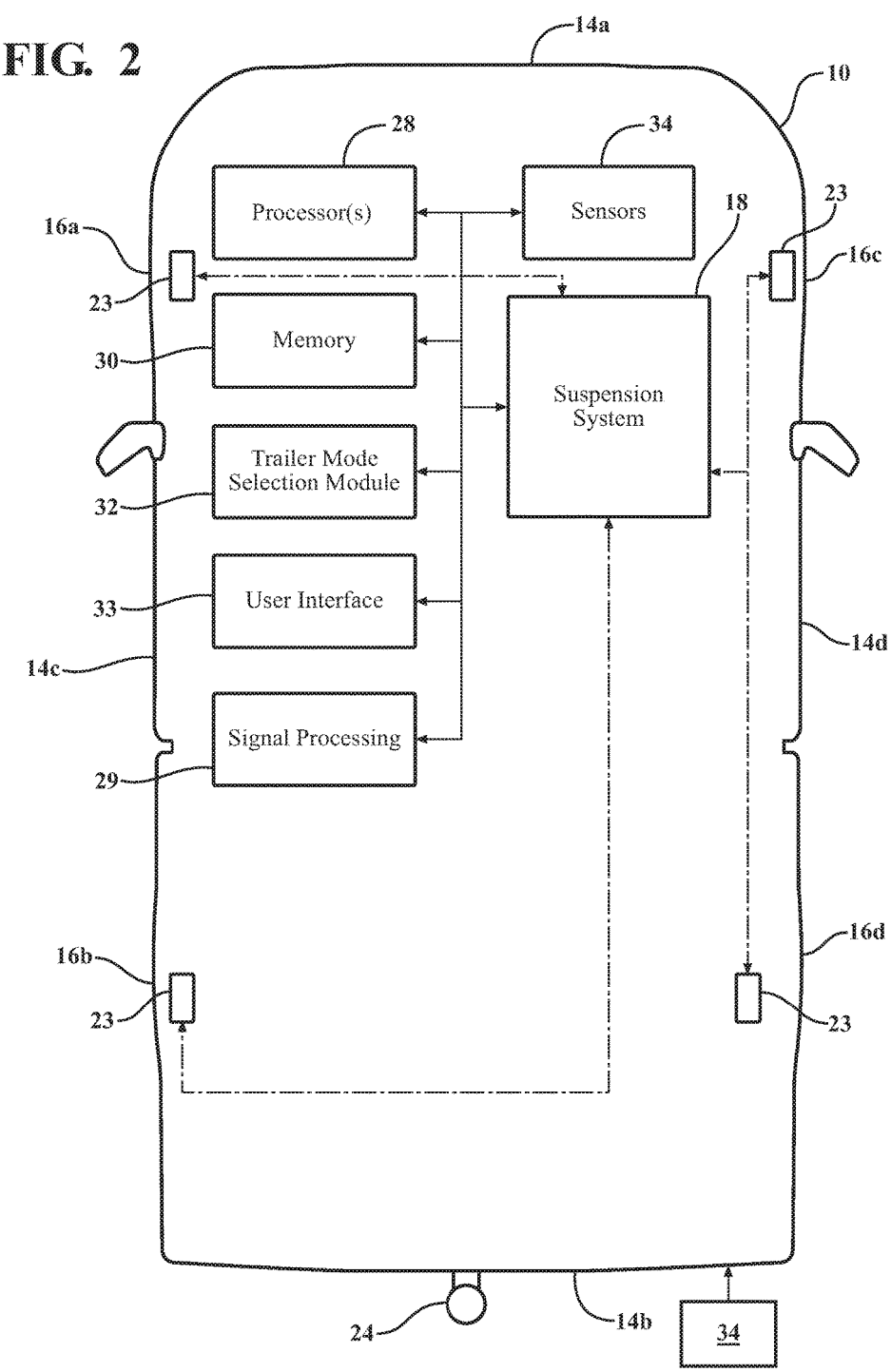

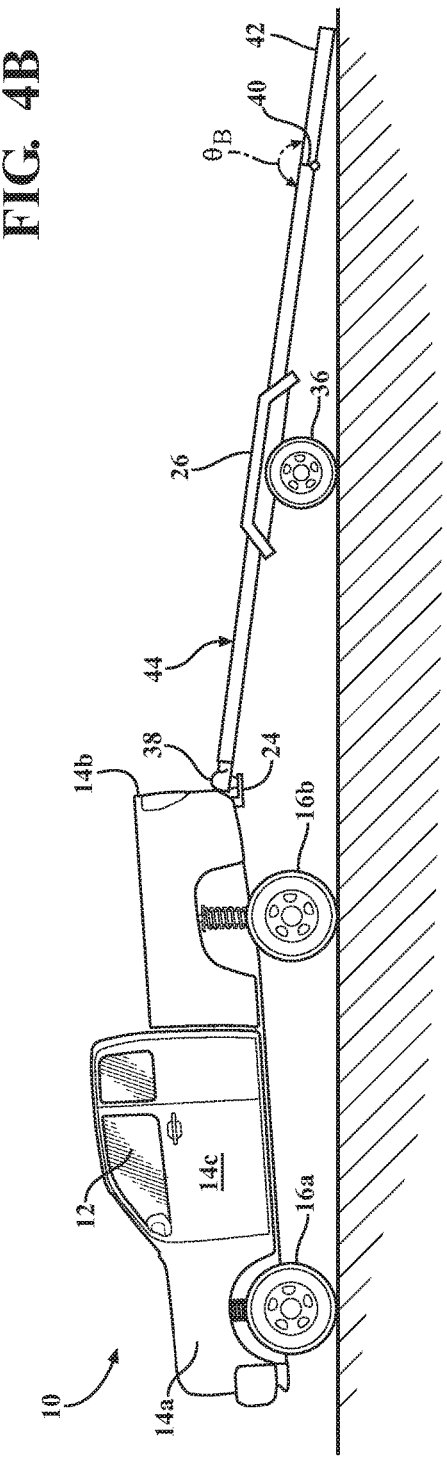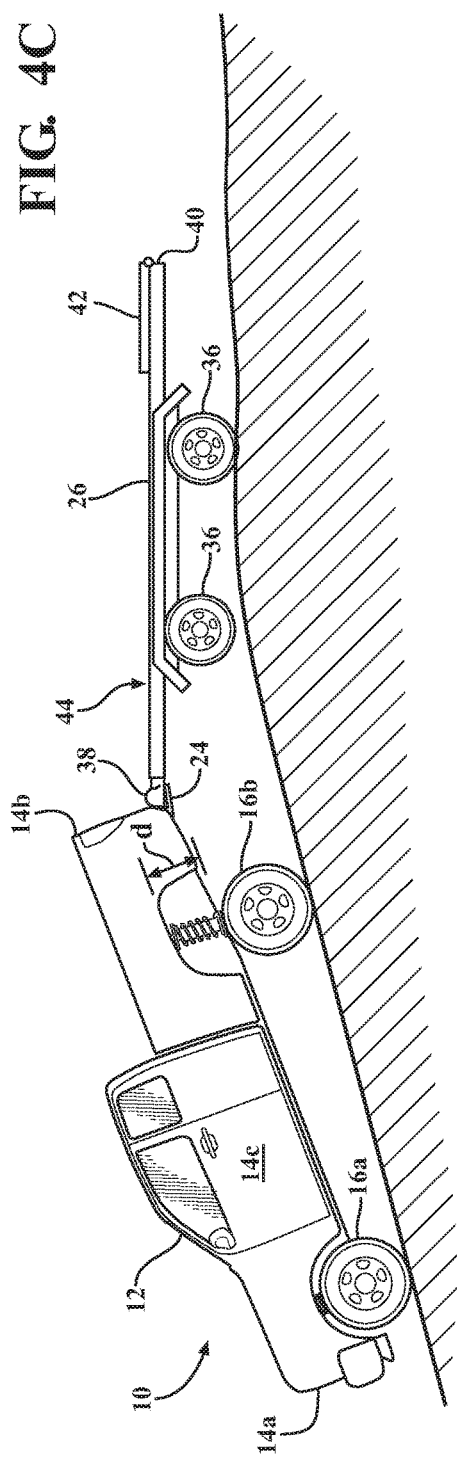

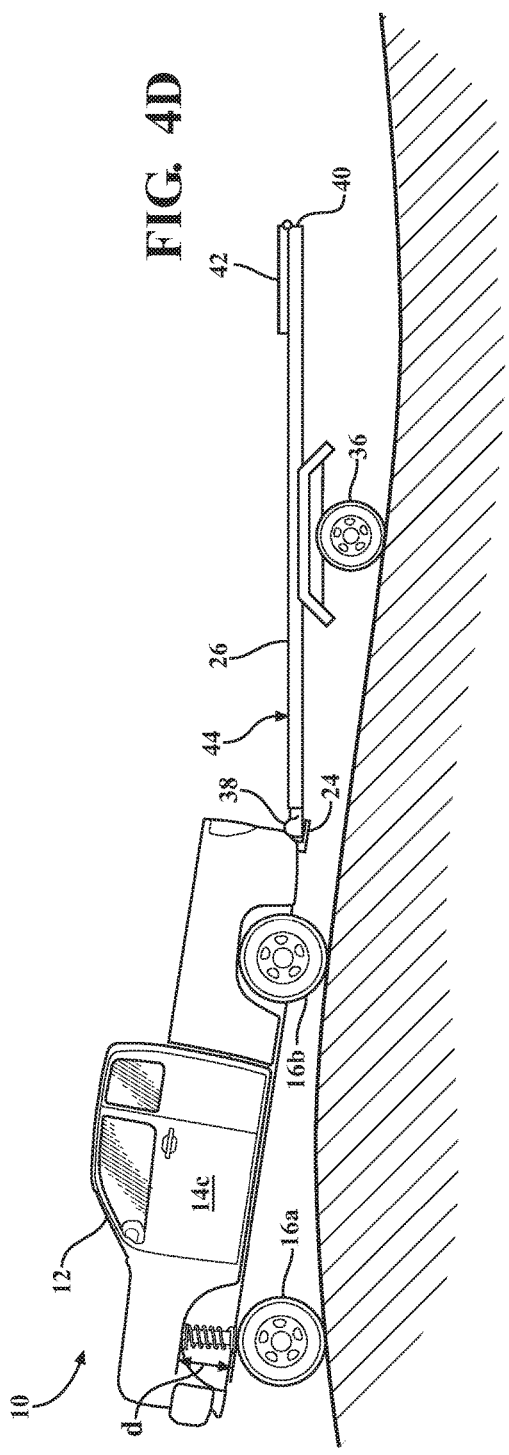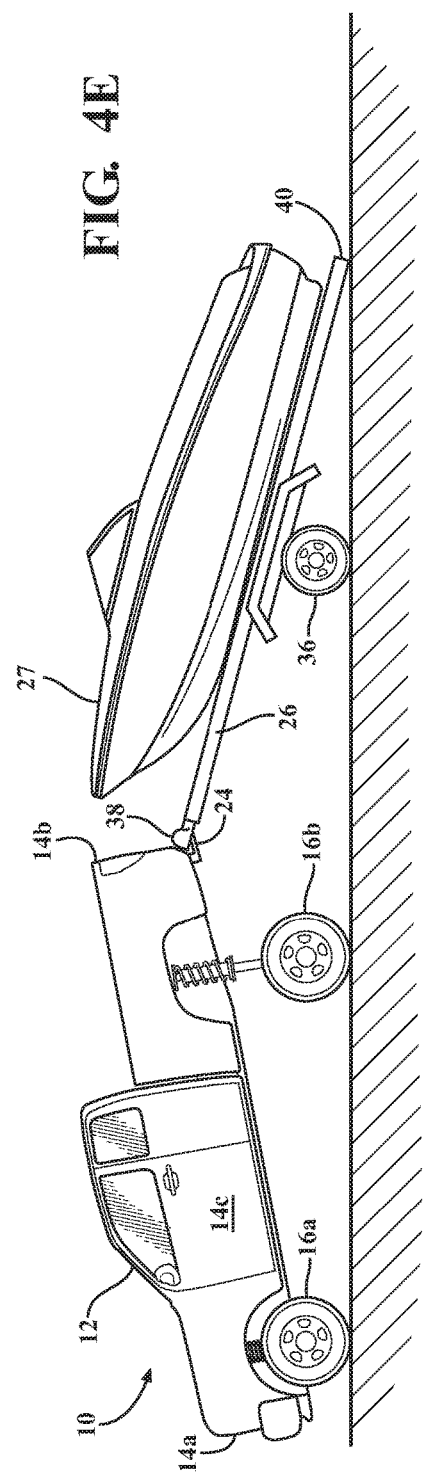

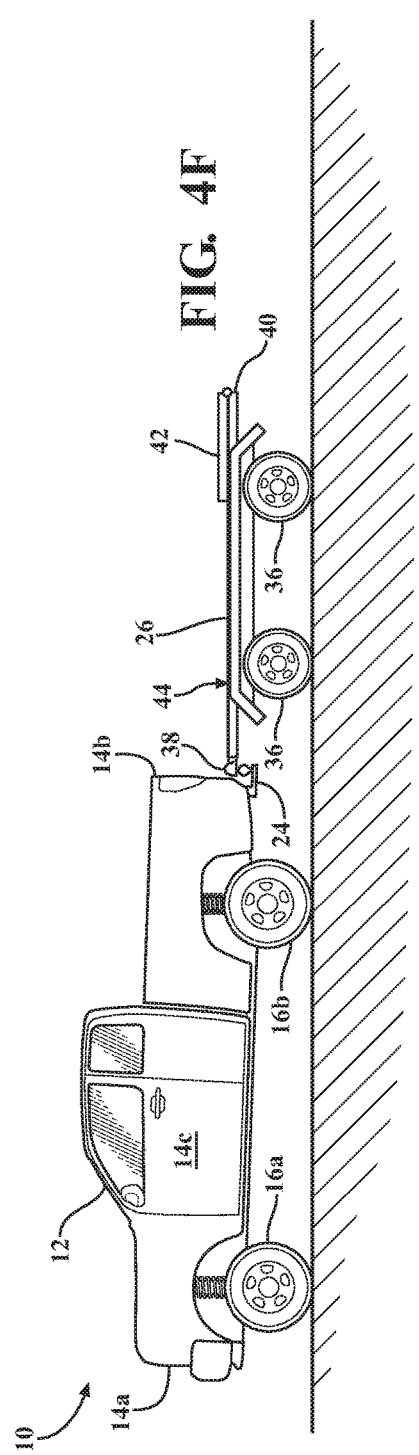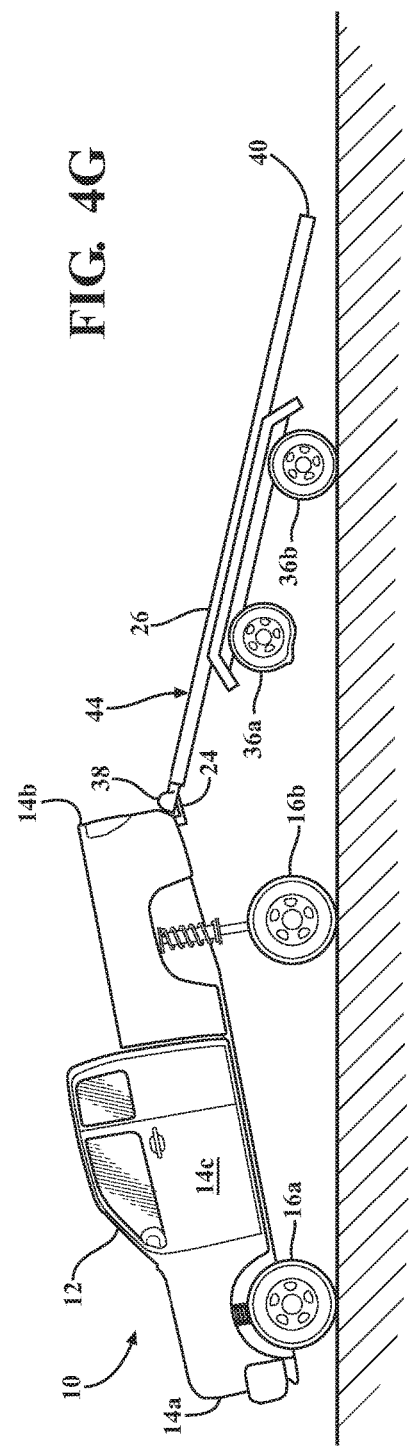

VEHICLE ATTITUDE MODIFICATION

TECHNICAL FIELD

The present disclosure relates to systems and methods for controlling the attitude of a vehicle.

BACKGROUND

Many vehicles are used to move trailers. These trailers are typically attached to the vehicle via a trailer hitch. The trailers typically include a ramp for loading and unloading objects onto the trailer. For an object to be loaded on the trailer, the owner must drive or push the object up the ramp and onto the trailer. This can cause damage to the object due to the difference between the approach angle of the ramp and the attitude of the trailer support surface. Likewise, for an object to be removed from the trailer, the owner must drive or push the object along the trailer support surface and down the ramp. This also can cause damage to the object due to the difference between the departure angle and the ground surface contour.

SUMMARY

In one example, an attitude modification system in a vehicle having a trailer attached thereto is disclosed. The system can include an active suspension system, one or more processors, and memory. The active suspension system can be connected to a body of the vehicle. The active suspension system can include at least one active component structured from controlling a distance between the vehicle body and a wheel of the vehicle so as to change an attitude of the vehicle body. The one or more processors can be operatively connected to the active suspension system. The memory can be operatively connected to the one or more processors for storing data and program instructions usable by the one or more processors. The one or more processors can be configured to initiate executable instructions stored in the memory to receive a selection of a trailer mode associated with a corresponding target configuration for the attached trailer. The one or more processors can be configured to initiate executable instructions stored in the memory to actuate the at least one active component in the active suspension system of the vehicle to control the distance between the vehicle body and the wheel of the vehicle so as to change the attitude of the vehicle body, so as to cause the attached trailer to have the target configuration.

In another example, an attitude modification system in a vehicle in an immobile state is disclosed. The system can include an active suspension system, a trailer hitch, and a processor. The active suspension system can include at least one active component for controlling a distance between a vehicle body and a wheel. The active suspension system can be configured to change an attitude of the vehicle body. The trailer hitch can be structured to enable attachment of a trailer thereto. The processor can be operatively connected to the active suspension system. The processor can be configured to initiate executable instructions to receive a selection of a trailer mode. The processor can be configured to initiate executable instructions to determine a target location of the trailer hitch needed to achieve a configuration associated with the selected trailer mode. The processor can be configured to initiate executable instructions to actuate the at least one active component in the active suspension system of the vehicle to change the attitude of the vehicle body so as to cause the trailer hitch to have the target location.

In another example, a method of modifying an attitude of a vehicle in an immobile state is disclosed. The method can include receiving a selection of a trailer mode associated with a corresponding configuration. The method can include determining one or more features about a trailer based on the selected trailer mode. The method can include determining a location of a trailer hitch needed to achieve the configuration corresponding to the selected trailer mode, the location being based on the one or more features about the trailer. The method can include actuating at least one active component in an active suspension system of the vehicle to change an attitude of the vehicle body so as to cause a trailer hitch to be located in the determined location thereby causing the vehicle body to be in the selected trailer mode.

BRIEF DESCRIPTION OF THE DRAWINGS

FIG. 1 is a side view of a vehicle.
FIG. 1A is a view of a wheel of the vehicle of FIG. 1.
FIG. 2 is a top view of a vehicle.
FIGS. 4A-4G are side views of a vehicle with an attached trailer in different trailer modes.

DETAILED DESCRIPTION

Figure 3A:
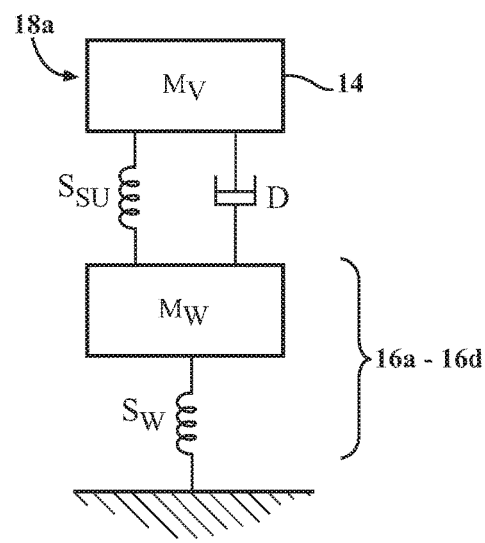
FIGS. 3A-3C are schematic views of suspension systems in a vehicle.

The present disclosure is related to systems and methods for modifying an attitude of a vehicle. A user selects a trailer mode for a vehicle body. The selected trailer mode has a corresponding configuration. The vehicle determines one or more features about a trailer based on the selected trailer mode. The vehicle determines a location of a trailer hitch needed to achieve the configuration corresponding to the selected trailer mode. The location is based on the one or more features about the trailer. The vehicle actuates at least one active component in the vehicle's active suspension system to change the attitude of the vehicle body so as to cause the trailer hitch to be located in the determined location thereby causing the vehicle body to be in the selected trailer mode.

Detailed examples are disclosed herein; however, it is to be understood that the disclosed examples are intended only to facilitate the description. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-6G, but the examples are not limited to the illustrated structure or application.

It will be appreciated that for simplicity and clarity of illustration, reference numerals have been repeated among the different figures where appropriate to indicate corresponding or analogous elements. In addition, numerous specific details are set forth in order to provide a thorough understanding of the embodiments described herein. However, it will be understood by those of ordinary skill in the art that the examples described herein can be practiced without these specific details.

Referring now to FIG. 1 and FIG. 2, an example of an attitude modification system in a vehicle 10 is shown. The vehicle 10 generally includes a vehicle body 12. The vehicle body 12 includes the chassis, and everything that the chassis supports (e.g., the frame, passenger compartment, engine, etc.). Although shown as a pick-up truck, the vehicle 10 can be any type of vehicle including but not limited to a sport utility vehicle (SUV), a hatchback, a van, a sedan, a station wagon, etc. The vehicle body 12 can include ends. The ends can be a front end 14a and a rear end 14b. The vehicle body 12 can also include sides 14c and 14d.

The vehicle 10 includes wheels 16. The wheels 16 can include both front wheels 16a, 16c and rear wheels 16b, 16d. As shown, the front wheels 16a, 16c can be located proximate the front end 14a, and the rear wheels 16b, 16d can be located proximate the rear end 14b. Wheels 16a, 16b can be on the first side 14c, and wheels 16c, 16d can be on the second side 14d. It should be understood that any number of wheels 16 can be included in the vehicle 10. The wheels 16 are known in the art, and generally include respective tires, rims, brake pads, etc.

The wheels 16a-16d are operatively connected to the vehicle body 12 via a suspension system 18. Operatively connected, as used herein, includes both direct and indirect connections. The suspension system 18 can modeled generally as a spring-mass-damper system shown in any of FIGS. 3A-3C, where the vehicle body 12 is the mass ($M_V$), the shock absorber 20 is the damper (D), and a spring 22 surrounds the shock absorber 20. The combination of the shock absorber 20 and the spring form a strut. An exemplary strut is a MacPherson strut. As is known in the art, as the vehicle 10 travels along a roadway and experiences changes in the ground surface contour, the spring 22 compresses and expands, and energy is transferred from the roadway into the spring 22. When the spring 22 compresses and expands, the energy that is in the spring 22 is absorbed by the shock absorber 20, such that little energy is transferred to the passenger compartment.

Figure 3B:
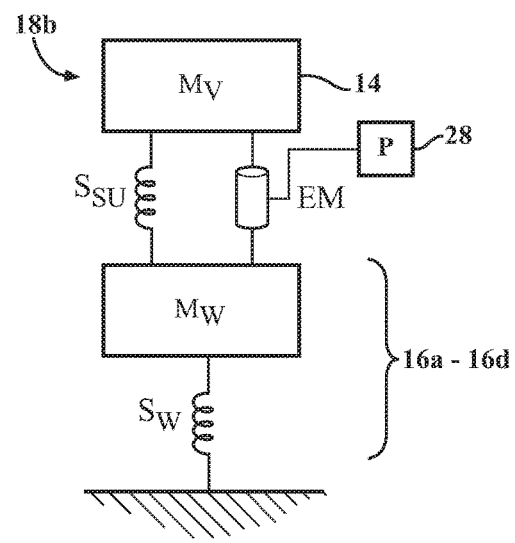
Figure 3C:
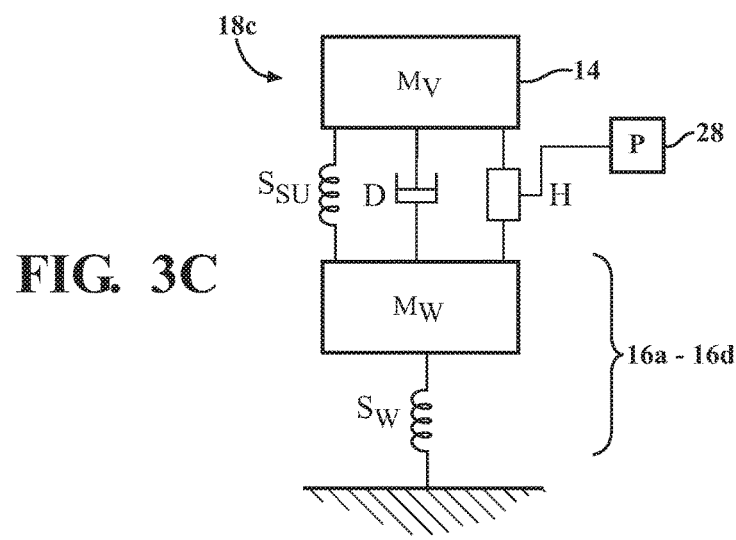

Referring now to FIGS. 3A-3C, the suspension system 18 can be an active suspension system shown schematically in either of FIGS. 3B and 3C. While shown in the Figures as a simple quarter-vehicle model, it should be understood in the art that a suspension system 18 as modeled in any of FIGS. 3A-3C (or in accordance with an alternative design) can be applied to all wheels 16a-d, of the vehicle, or to any individual wheel, or to any combination of the wheels 16a-d.

The first suspension system 18a, shown in FIG. 3A, is known as a passive suspension system. The suspension system 18 includes masses $M_V$ and $M_W$, which represent the mass of the vehicle body 12 and wheel 16, respectively; springs $S_{SU}$ and $S_W$, wherein $S_{SU}$ represents a spring in the suspension system 18 and the elastic behavior of the tire responsive to contact with the road is represented as a spring element $S_W$; and D represents damping in the suspension system 18.

The second and third suspension systems 18b, c shown in FIGS. 3B-3C, respectively, are known as active suspension systems. These active suspension systems include at least one active component 23 (of FIG. 2). In one or more arrangements, the at least one active component 23 can be an electromagnetic actuator EM, a hydraulic actuator H, an air bag (not shown), or any other component capable of providing a control input to the suspension system to affect the attitude of a vehicle as described herein. In the suspension system 18 shown in FIG. 3B, the damper D is replaced with the electromagnetic actuator EM. In this system, the electromagnetic actuator EM receives inputs from processor(s) 28 (of FIG. 1). In a manner known in the art, the processor(s) 28 monitor conditions of the vehicle 10, and adjust the electromagnetic actuator EM accordingly. When the electromagnetic actuator EM is adjusted, the distance between the wheel 16 and vehicle body 12 changes. Such an active suspension system is shown and described in U.S. patent application Ser. No. 14/537,261, Pub. No. 2016/0129749 A1 assigned to Bose Corp., which is incorporated herein by reference in its entirety. Additionally or alternatively, in the active suspension system shown in FIG. 3C, the hydraulic actuator H is added to the suspension system between the vehicle body (depicted as $M_V$) and an associated wheel. In a manner similar to the control of electromagnetic actuator EM exercised in suspension system 18b of FIG. 3B, the processor(s) 28 monitor conditions of the vehicle 10, and actuate the hydraulic actuator H accordingly. When the hydraulic actuator H is actuated, the distance between the wheel 16 and vehicle body 12 changes. Such an active suspension system is shown and described in U.S. Pat. No. 9,421,843 B2 assigned to Mando Corp., which is incorporated herein by reference in its entirety. Another type of active suspension system is known as an air bag suspension system. Active suspension systems such as these control air supply to an air bag in the suspension system. When the air bag is inflated or deflated, the distance between the wheel 16 and the vehicle body 12 changes. Such an active suspension system is shown and described in U.S. Pat. No. 8,172,237 B2 to Peterson, which is incorporated herein by reference in its entirety.

Although these types of active suspension systems 18 are shown and described, many different types of active suspension systems 18 can be used with the vehicle 10. Accordingly, this disclosure should not be limited to these exemplary active suspension systems 18, and it should be understood that embodiments of the attitude modification system described herein may be configured to operate with any suspension system 18 that is capable of controlling, via at least one active component 23, the distance d between one or more of the wheels 16a, 16b and the vehicle body 12. Thus, the active suspension system 18 incorporated into the vehicle 10 also effectively controls the distance between the vehicle body 12 and a road surface upon which the wheels 16a-d reside. More specifically, the active suspension system 18 can be used to control the distance between the road surface and a trailer hitch 24 or other feature of the vehicle 10 which is connectable to a trailer 26 to be towed by the vehicle 10.

Referring back to FIG. 1, the vehicle 10 can include a trailer hitch 24. The trailer hitch 24 can be connected adjacent the rear end 14b of the vehicle body 12. The trailer hitch 24 can be attached to the vehicle body 12, and the vehicle 10 can move a trailer 26 (as shown in of FIGS. 4A-4G) attached thereto. As such, the trailer 26 can be attached to the vehicle 10 via the trailer hitch 24. The connection between the trailer 26 and the trailer hitch 24, referred to herein as the hitch point, can be displaced as described herein with actuation of the active components 23 in the active suspension system 18.

Referring back to FIG. 1 and FIG. 2, the vehicle 10 can include one or more processor(s) 28. In one or more arrangements, the processor(s) 28 can be configured to control and/or modify the active suspension system 18. Accordingly, the processor(s) 28 can be operatively connected to the active suspension system 18. The processor(s) 28 can send control signals to at least one active component 23 of the active suspension system 18. The processor(s) 28 can also control other components of the vehicle 10. The processor(s) 28 can be any component or group of components that are configured to execute any of the processes described herein or any form of instructions to carry out such processes or cause such processes to be performed. The processor(s) 28 can be implemented with one or more general-purpose and/or special-purpose processors. Examples of suitable processor(s) 28 can include microprocessors, microcontrollers, digital signal processors, and other circuitry that can execute software. Further examples of suitable processor(s) 28 include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 28 can include at least one hardware circuit (e.g., an integrated circuit) configured to carry out instructions contained in program code. In arrangements in which there is a plurality of processor(s) 28, such processors can work independently from each other or one or more processors can work in combination with each other. In one or more arrangements, the processor 28 can be a main processor of the vehicle 10. For instance, the processor 28 can be an electronic control unit (ECU).

The vehicle 10 can include a signal processing unit 29. The signal processing unit 29 can, for example, receive signals from various components of the vehicle 10, pre-process received signals for use by the processor(s) 28, process control signals prior to transmission to other vehicle components for use by the vehicle components, and relay the signals to the other components. In one or more arrangements, the signal processing unit 29 can be a sub-component of the processor 28. In another arrangement, the signal processing unit 29 can be a standalone component, and operate in conjunction with or separately from the processor 28.

The vehicle 10 can include computer readable medium. In one or more arrangements, the computer readable medium can be memory 30. The memory may store data and program instructions usable by the one or more processors 28. The memory 30 can include volatile and/or non-volatile memory. Examples of suitable memory 30 includes RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 30 can include instructions in program code stored thereon. Such instructions can be executed by the processor(s) 28, and/or one or more modules of the vehicle 10. In one or more arrangements, the memory 30 can be a component of the processor(s) 28. In one or more arrangements, the memory 30 can be operatively connected to the processor(s) 28, and/or one or more modules of the vehicle 10 and used thereby. Operatively connected can include direct or indirect connections, including connections without direct physical contact.

The vehicle 10 can further include various modules for performing various tasks in the vehicle 10. The modules can be implemented as computer readable program code that, when executed by the processor(s) 28, implement one or more of the various processes described herein. Such computer readable program code can be stored on the memory 30. The modules can be a component of the processor(s) 28, or the modules can be executed on and/or distributed among other processing systems to which the processor(s) 28 are operatively connected. The modules can include instructions (e.g., program logic) executable by the processor(s) 28. Additionally or alternatively, the memory 30 can contain such instructions. The various modules can be operatively connected to the processor(s) 28.

In one or more arrangements, the vehicle 10 can include a trailer mode selection module 32. The trailer mode selection module 32 can receive a trailer mode selection from a user. The processor(s) 28 can receive a command from the trailer mode selection module 32 indicating a selection of a trailer mode by the user. The user can input the selection via a user interface 33. The user interface 33 can be, for example, a display screen on the vehicle head unit (not shown), a button, dial or switch in the vehicle interior or near the rear end 14*b* of the vehicle 10, or other interface between a user and a vehicle 10. The selection can indicate a desired trailer mode from a plurality of trailer modes. The selection can be provided to the trailer mode selection module 32 which includes the plurality of trailer modes. In one or more arrangements, the trailer mode selection module 32 can further include a configuration associated with each of the plurality of trailer modes. The configuration can include, for example, an attitude for the vehicle body 12 and/or trailer 26, a position of a trailer hitch 24 with respect to the trailer 26, etc. Attitude, as used herein with respect to the vehicle 10 and/or trailer 26, refers to an orientation of the vehicle and/or trailer with respect to a road surface on which the vehicle and/or trailer resides, and may include the heave, yaw, pitch, and roll of the vehicle and/or trailer. FIG. 1 includes reference axes. The reference axes can be used to define yaw, pitch, and roll about the intersection of the axes. The reference axes include a yaw axis Y-Y about which vehicle yaw may change or occur, a pitch axis P-P about which vehicle pitch may change or occur, and a roll axis R-R about which vehicle roll may change or occur. The axes Y-Y, P-P, and R-R axes intersect at the center of the compass. The center can be positioned anywhere throughout the vehicle 10 and/or trailer 26, and the vehicle 10 and/or trailer 26 can be rotated about the intersection of the axes. In one or more arrangements, the intersection of the axes can be positioned outside the vehicle 10 and/or trailer 26. In one or more arrangements, the intersection of the axes can be positioned at the center of gravity of the vehicle 10 and/or attached trailer 26. In one or more arrangements, the intersection of the axes can be positioned about an end or side of the vehicle 10 and/or attached trailer 26. Yaw, as used herein, refers to motion of the vehicle about the Y-Y axis. For example, in a vehicle configuration where the vehicle is rotated or spun about a vertical axis, the vehicle's yaw is said to be changed. Pitch, as used herein, refers to motion of the vehicle (or plane) about the P-P axis. For example, in a vehicle configuration where the front end is lower that the rear end (on a level road surface), the vehicle may be said to have a forward pitch. Similarly, in a vehicle configuration where the front end is higher that the rear end, the vehicle may be said to have a rearward pitch. Roll, as used herein, refers to motion of the vehicle about the R-R axis. For example, the roll of the vehicle could be about an axis extending between a location where a front wheel contacts a road surface and a location where a rear wheel on the same side of the vehicle contacts the road surface. Heave, as used herein, includes bulk upwards or downwards motion. In one or more arrangements, the vehicle 10 and/or attached trailer 26 can be heaved in a bulk upwards or downwards motion along the Y-Y axis.

Figure 4A:
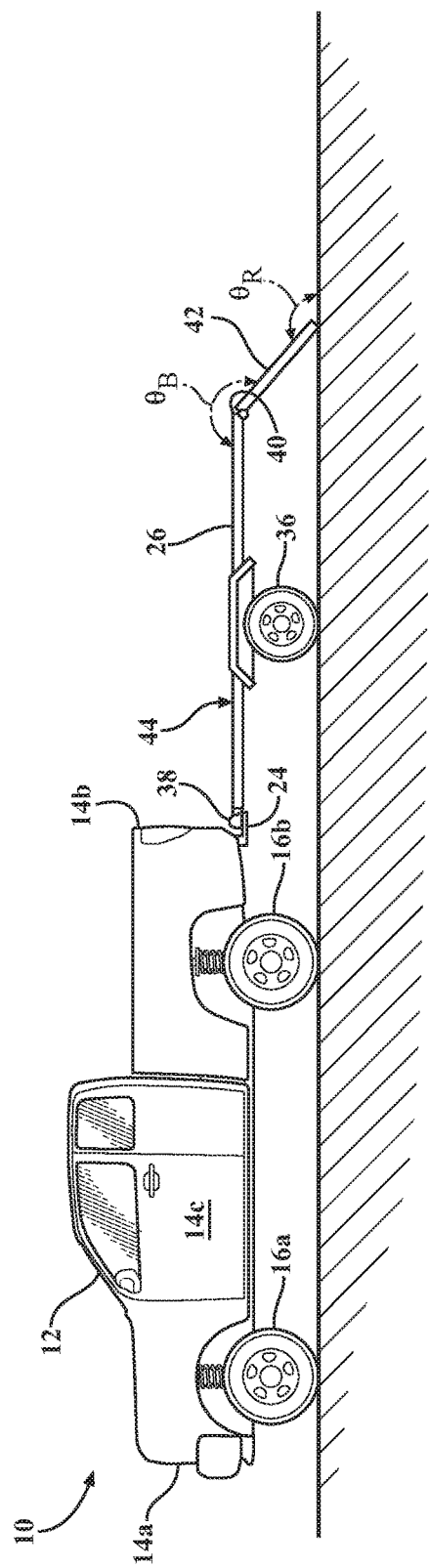

Additionally, each of the portions of the attached trailer 26 can have an associated attitude. As shown in FIG. 4A, in one or more arrangements, the attitude of the support surface 44 can be substantially the same as the attitude of the vehicle body 12. Also, as shown in FIGS. 4B-4G, the attitude of the trailer support surface 44 can be different from the attitude of the vehicle body 12. In addition, as seen in FIGS. 4A and 4B, the attitude of the ramp 42 may be different from either the attitude of the support surface 44 or the attitude of the vehicle body 12. Furthermore, the attitude of the attached trailer 26 and/or the ramp 42 can be changed by modifying the attitude of the vehicle body 12, as will be described in greater detail below.

The trailer 26 can have one or more axles and tires 36. Additionally, the trailer 26 can be open, as shown in FIGS. 4A-4G, or the trailer 26 can be partially or fully enclosed. The trailer 26 can include an attachment end 38 and a loading end 40. The attachment end 38 can engage the trailer hitch 24 of the vehicle body 12 at the hitch point. The loading end 40 can include a ramp 42 rotatably connected to the loading end 40. The loading end 40 can be the end at which objects are typically loaded from the ground surface to a support surface 44 of the trailer.

The vehicle 10 and/or trailer 26 can also include one or more sensor(s) 34. The one or more sensors 34 can be configured to monitor something in the external environment of the vehicle 10. In one or more arrangements, the one or more sensor(s) 34 can be configured to monitor in real-time. Real-time can be a level of processing responsiveness that a user or system senses as sufficiently immediate for a particular process or determination to be made, or that enables the processor to keep up with some external process. The one or more sensors 34 can be positioned anywhere in or on the vehicle 10 or on the trailer 26. The one or more sensors 34 can at least partially include existing systems of the vehicle 10, such as backup sensors, lane keeping sensors, and/or front sensors, just to name a few possibilities.

The one or more sensors 34 can be configured to detect a location of a trailer 26 with respect to the vehicle body 12. In one or more arrangements, the one or more sensors 34 can be configured to locate portions of the trailer 26 (e.g., the attachment end 38, loading end 40, support surface 44, etc.). Additionally or alternatively, the one or more sensors 34 can be configured to detect whether a trailer 26 is attached to the vehicle body 12. In these examples, the one or more sensors 34 can be a camera, radar, or lidar sensors, to name a few possibilities. Additionally or alternatively, the processor(s) 28 can determine that the trailer's 26 brake light controller connector has been connected to the trailer connector (not shown) on the vehicle 10 to detect whether the trailer 26 is attached to the vehicle body 12. Additionally or alternatively, the trailer hitch 24 and/or the attached trailer 26 can include a contact sensor. The contact sensor can transmit a contact signal when the trailer 26 touches (e.g., is attached to) the trailer hitch 24. Additionally or alternatively, the processor(s) 28 can be configured to assume that a trailer 26 is attached to the vehicle body 12 upon receiving a selection from a user via the trailer mode selection module 32.

In one or more arrangements, the sensor(s) 34 can be configured to detect or estimate an attitude of the body that the sensor(s) 34 is attached to. Certain ones of sensor(s) 34 can be attached to the vehicle body 12, the attached trailer 26, etc. When attached to the trailer 26, the sensors 34 can be attached to the support surface 44 (of FIGS. 4A-4G), the ramp 42, etc. The sensor(s) 34 can be, for example, an accelerometer, gyroscope, magnetic field sensor, inclinometer, tilt sensor, etc. In one or more arrangements, the vehicle 10 and/or the attached trailer 26 can include an inertial measurement unit (IMU). Such exemplary sensors 34 can be used to detect or estimate the attitude of the body (e.g., vehicle body 12 and/or a portion of the attached trailer 26) that they are mounted to. In some instances, such exemplary sensors 34 can also be used to estimate the attitude of a body that they are not mounted to. For example, where the sensor(s) 34 are attached to the vehicle body 12, the processor(s) 28 can assume that the current attitude of the support surface 44 of the attached trailer 26 is the same as the current attitude of the vehicle body 12.

In one or more arrangements, sensor(s) 34 can be mounted on the trailer 26 to detect the breakover angle $\theta_B$. For example, the sensor(s) 34 can be inclinometers that are positioned on, for example, the ramp 42 and the support surface 44. Based on the difference in the incline between the ramp 42 and the support surface 44, the breakover angle $\theta_B$ can be calculated.

The processor(s) 28 can be configured to determine whether the vehicle 10 is in an immobile state. The processor(s) 28 can make this determination via, for example, one or more sensor(s) 34 detecting velocity, the transmission state (e.g., park or neutral), whether the emergency brake is active, whether the engine is on or in an idle state, whether the key is in the ignition, etc. In one or more arrangements, if the processor(s) 28 determine that the vehicle 10 is not in an immobile state, the processor(s) 28 can be configured to automatically place the vehicle in an immobile state. This can be performed by, for example, automatically actuating a parking brake, shifting the transmission to park or neutral, putting the engine in an idle state, etc.

The processor(s) 28 can be configured to control the one or more active components 23 of the active suspension system 18 to change the distance d between one or more of the wheels 16 and the vehicle body 12. In this regard, the processor(s) 28 can be configured to send electrical signals to the one or more active components 23 to actuate the one or more active components 23 of the active suspension system 18, and thereby change the attitude of the vehicle body 12. The changes to the attitude of the vehicle body 12 can include, for example, changes in the pitch of the vehicle body 12, and/or changes in the roll of the vehicle body 12. For example, the changes in the pitch of the vehicle body 12 can be about an end (e.g., front end 14a and/or rear end 14b) of the vehicle body 12. The changes in the roll of the vehicle body 12 can be about sides (14c and/or 14d) of the vehicle body 12.

Referring now to FIGS. 4A-4G, side views of the vehicle 10 with an attached trailer 26 in different trailer modes are shown. The user can select any of the various different trailer modes via the user interface 33 (of FIG. 2). The various modes can correspond to the vehicle body 12 having an attitude resulting in a configuration of the vehicle body 12 and/or attached trailer 26 associated with each of the various modes.

The trailer mode selection module 32 can include various modes where the attitude of vehicle body 12 and/or portions of the attached trailer 26 are modified. In one or more arrangements, the trailer mode selection module 32 can include various types of modes, such as traditional modes and trailer attitude modification modes. As stated, the trailer mode selection module 32 can further include a predetermined configuration associated with each of one or more of the trailer modes. Each predetermined configuration can include, for example, an attitude for the vehicle body 12 and/or trailer 26, a position of a trailer hitch 24 with respect to the trailer 26, etc. In one or more arrangements, the various trailer modes can be stored in the trailer mode selection module 32. In one or more arrangements, the various modes can be stored in memory 30, and accessed by the trailer mode selection module 32.

In one or more arrangements, the various modes may include a manual mode which does not have a predetermined configuration associated therewith. In this example, the configuration is controlled by the user providing one or more manual inputs to the attitude modification system after selection of the manual mode. In this example, the user can set the configuration for the vehicle 10 and/or attached trailer 26 via the user interface 33. The user may manually provide inputs to the system while monitoring the resulting changes to the configuration, until a desired configuration is achieved. The user's desired configuration may vary according to a particular application or particular circumstances. The manual mode enables a user to directly and incrementally control the actuatable components 23 of the active suspension system 18 to achieve a particular desired configuration. Thus, in one or more arrangements, a desired configuration may not be stored on memory 30, and is only the result of manual control of the active components 23 of the active suspension system 18 at a particular point in time for a particular application.

In one or more arrangements, the trailer mode selection module 32 can transmit one or more commands to the processor(s) 28 to control the active suspension system 18. The one or more commands can be in accordance with the selected trailer mode. The commands can be generated by the user, such as when the user selects the manual mode. The commands can be generated by the processor(s) 28 based on, for example, current features or attributes associated with the vehicle 10 and/or attached trailer 26 and/or the selected trailer mode.

Specifically, in FIG. 4A, the vehicle 10 is in a trailer tow mode. In this mode, the active suspension system 18 operates in a traditional manner. For example, in this mode, the active suspension system 18 reacts to the road surface to provide a smooth ride, while maintaining near-optimal aerodynamics, all while the vehicle 10 is in a mobile state. In one or more arrangements, the trailer tow mode can be the default mode. The trailer tow mode shown in FIG. 4A may have a corresponding configuration. The configuration can correspond to, for example, a configuration for the vehicle body 12 and/or a configuration for the trailer 26. In one or more arrangements, the configuration corresponding to the trailer tow mode may be, for example, where the vehicle body 12 is maintained at a level position. Additionally or alternatively, the configuration corresponding to the trailer tow mode may be, for example, where the support surface 44 is maintained at a level position. As will be discussed in greater detail below, in the trailer tow mode, the vehicle 12 does not need to be in an immobile state.

In FIG. 4B, the vehicle 10 is in a trailer load/unload mode. In this mode, the user may want to load or unload an object onto the trailer support surface 44. Where the vehicle 10 is in the trailer tow mode shown in FIG. 4A, and the user wants to load or unload an object onto or off of the trailer 26, the approach angle $\theta_R$ between the ramp 42 and road surface 11, and/or the breakover angle $\theta_B$ of the junction between the ramp 42 and the loading end 40 of the trailer support surface 44 may cause damage to the object if the angle is too great.

Therefore, the user may select the trailer load/unload mode shown in FIG. 4B on the user interface 33. The trailer load/unload mode may have a corresponding configuration. The configuration may be associated with a configuration of the trailer 26 and/or the vehicle body 12. The configuration can be stored on memory 30, in the trailer mode selection module 32, etc. The configuration can be stored as associated with the trailer load/unload mode. In one or more arrangements, where the configuration is a configuration for the trailer 26, the configuration for the trailer 26 can be, for example, where the attachment end 38 of the trailer 26 is located above the loading end 40. The configuration can also be, for example, a target breakover angle $\theta_B$. For example, the target breakover angle may be substantially 180°. Additionally or alternatively, the target breakover angle $\theta_B$ may be variations from 180° (e.g., +/−5°, +/−10°, +/−15°, etc.). In one or more arrangements, where the configuration is a configuration for the vehicle body 12, the configuration can be, for example, where the rear end 14b is positioned above (e.g., elevated with respect to) the front end 14a.

Responsive to receiving a selection, via the user interface 33, of the trailer load/unload mode, the processor(s) 28 can determine one or more features about the trailer 26. In one or more arrangements, the processor(s) 28 can determine whether the trailer 26 has been attached, the current attitude for the vehicle body 12 and/or one or more surfaces of the trailer 26 (e.g., ramp 42, support surface 44, etc.). In one or more arrangements, the processor(s) 28 can determine the direction of hitch movement needed to achieve the configuration associated with the trailer load/unload mode. This can be done, for example, by comparing the current attitude for the vehicle body 12 and/or one or more surfaces of the trailer 26 with the attitudes of the vehicle body 12 and/or one or more surfaces of the trailer 26 in the configuration associated with the trailer load/unload mode, and determining the difference between the current attitudes and the trailer load/unload mode configuration attitudes.

Responsive to determining the direction of hitch movement, the processor(s) 28 can control the active suspension system 18 to change the attitude of the vehicle body 12 to produce the required hitch movement. As a result, the attitude of the trailer support surface 44 and ramp 42 of an attached trailer are changed. In this mode, the processor(s) 28 can actuate at least one active component 23 in the active suspension system 18 to at least change the pitch of the vehicle body 12. To change the pitch of the vehicle body 12, in one or more arrangements, the processor(s) 28 can actuate at least one active component 23 for one or more of the rear wheels 16b, 16d to increase a distance d1 between the rear wheels 16b, 16d and the vehicle body 12. Additionally or alternatively, the processor(s) 28 can actuate at least one active component 23 for the front wheels 16a, 16c to decrease a distance d2 between the front wheels 16a, 16c and the vehicle body 12. Increasing a distance d1 between the one or more rear wheels 16b, 16d and the vehicle body 12 and/or decreasing a distance d2 between the one or more front wheels 16a, 16c and the vehicle body 12 both cause at least the pitch of the vehicle body 12 to change. In the example shown in FIG. 4B, the rear end 14b of the vehicle body 12 is raised with respect to the front end 14a of the vehicle body 12. Thus, the vehicle body 12 tips down in the front end 14a, or tips up in the rear end 14b. Changing the pitch of the vehicle body 12 in this manner causes the hitch point between the trailer hitch 24 and the attachment end 38 of the trailer 26 to be displaced from a relatively lower position to a relatively higher position. As a result, the attachment end 38 of the trailer 26 is positioned above the loading end 40 of the trailer. This causes both the approach angle $\theta_R$ to be and the breakover angle $\theta_B$ to be changed.

In one or more arrangements, the processor(s) 28 may control the active suspension system 18 to raise, via the at least one active component 23 in the active suspension system 18, the rear end 14b of the vehicle body 12 to its maximum height (e.g., maximum allowable expansion of the active component 23 in the active suspension system 18). Additionally or alternatively, the processor may control the active suspension system 18 to lower, via the at least one active component 23 in the active suspension system 18, the front end 14a of the vehicle body 12 to its minimum height (e.g., maximum allowable retraction of the active component 23 in the active suspension system 18). In a particular embodiment, the vehicle active suspension system is controlled so as to adjust the position of the hitch point to achieve a breakover angle $\theta_B$ of substantially 180°.

In one or more arrangements, the processor(s) 28 may actuate the at least one active component 23 of the active suspension system 18 based on the dimensions of the trailer 26. For example, the user can input the type of trailer 26 (e.g., make/model, serial number, etc.) and/or the pertinent dimensions of the trailer 26, and the processor(s) 28 can calculate the hitch point position needed to provide the desired trailer configuration. It should be noted that, where the user inputs the type of trailer 26, the processor(s) 28 may access a database including a plurality of trailer types and corresponding pertinent dimensions for each of the plurality of trailer types, and determine the pertinent dimensions for the inputted trailer type. Such dimensions can include one or more of, for example, the trailer length, the ramp length, the trailer height from ground, the number of axles, the distance between the axles, the distance from the ramp to the nearest axle, etc.

In one example, the hitch point position can be calculated to achieve a breakover angle $\theta_B$ of substantially 180°. In another example, the hitch point position can be calculated to achieve a breakover angle $\theta_B$ of less than or greater than 180°.

In one or more arrangements, the processor(s) 28 may actuate the at least one active components 23 of the active suspension system 18 based on a user selection. In this example, the user can set the actuation of the at least one active component 23 in the active suspension system 18 to achieve, for example, a user-selected breakover angle $\theta_B$. The user can select, for example, the breakover angle $\theta_B$. The processor(s) 28 can determine, using information from the at least one sensors 34, a current breakover angle $\theta_B$ for the junction between the ramp 42 and support surface 44 of the trailer 26. The processor(s) 28 can then calculate a location of the hitch point position needed to provide the selected breakover angle $\theta_B$ using pertinent dimensions of the trailer and other pertinent information.

In one or more arrangements, the user can manually actuate, via the user interface 33, the at least one active component 23 of the active suspension system 18 to achieve a desired breakover angle $\theta_B$. In this example, the user interface 33 can display information related to the current configuration of the trailer 26 (e.g., the current breakover angle $\theta_B$, an image of the trailer 26, etc.) as the user manually actuates the at least one active components 23 of the active suspension system 18 until the desired breakover angle $\theta_B$ is achieved.

In FIGS. 4C and 4D, the vehicle 10 is in trailer leveling mode. In this mode, the user may have parked the vehicle 10 on an uneven or sloped surface. Where the vehicle 10 is in the trailer tow mode shown in FIG. 4A, and the vehicle 10 is parked on an uneven or sloped surface, a support surface 44 of the trailer 26 may be generally parallel to the roadway surface. In such a case, the support surface 44 of the trailer 26 is not level (i.e., horizontal, or extending perpendicular to a direction of a gravitational force on the trailer), and objects positioned on the support surface 44 may not be as secure.

Therefore, the user may select the trailer leveling mode shown in FIGS. 4C and 4D on the user interface 33. The trailer leveling mode may have a corresponding configuration. The configuration may be a configuration of the trailer 26. The configuration can be stored on memory 30, in the trailer mode selection module 32, etc. The configuration can be stored as associated with the trailer leveling mode. In one or more arrangements, the configuration can be, for example, where the trailer support surface 44 is level (e.g., where the trailer support surface 44 is horizontal, or extending perpendicular to a direction of a gravitational force on the trailer support surface 44).

Responsive to receiving a selection of the trailer leveling mode, the processor(s) 28 can determine one or more features about the trailer 26. In one or more arrangements, the processor(s) 28 can determine whether the trailer 26 has been attached and/or the current attitude for the support surface 44 of the trailer 26. In one or more arrangements, the processor(s) 28 can determine the direction of hitch movement needed to achieve the configuration associated with the trailer leveling mode. This can be done, for example, by comparing the current attitude for the support surface 44 of the trailer 26 with the configuration associated with the trailer leveling mode, and determining the difference between the current attitude and the trailer leveling mode configuration.

Responsive to determining the direction of hitch movement, the processor(s) 28 can control the active suspension system 18 to change the attitude of the vehicle body 12 to produce the required hitch movement. As a result, the attitude of the support surface 44 is changed. To change the attitude of the vehicle body 12, in one or more arrangements, the processor(s) 28 can actuate at least one active component 23 for one or more of the front wheels 16a, 16c and rear wheels 16b, 16d on either side of the vehicle body 12 to change a distance between one or more of the wheel(s) and the vehicle body 12. Changing the attitude of the vehicle body 12 in this manner causes the hitch point between the trailer hitch 24 and the attachment end 38 of the trailer 26 to be displaced from a first position to a second position.

The processor(s) 28 can control the active suspension system 18 to achieve an attitude of the vehicle body 12 that results in the support surface 44 of the trailer 26 being level when the hitch point is in the second position. In one or more arrangements, the processor(s) 28 can calculate a hitch point that will result in the support surface 44 of the trailer 26 being level based on data received from the one or more sensor(s) 34 detecting an attitude of the support surface 44. In this example, the attitude of the support surface 44 can be determined using a sensor 34 positioned thereon. The processor(s) 28 can actuate the at least one active component 23 in the active suspension system to change the attitude (e.g., at least pitch and/or roll) of the vehicle body 12 and, as a result, cause the support surface 44 of the trailer 26 to be level.

In FIG. 4E, the vehicle 10 is in fluid drain mode. In the fluid drain mode, the trailer 26 is hauling an object retaining fluid that is desired to be removed. In the example shown, the trailer 26 is hauling a boat 27. The boat 27 may have retained water. Therefore, the user may want to tip the boat 27 to drain the water from the boat 27. While the example described herein is in regards to draining water from a boat 27, it should be understood that the present disclosure isn't limited to this example. In one or more arrangements, other types of fluids (e.g., dirt, sand, liquids, etc.) may be drained from objects on the trailer 26. In one or more arrangements, the fluid drain mode may be used to drain types of fluids directly from the trailer 26.

To drain the water from the boat 27, the user may select, via the user interface 33, the fluid drain mode shown in FIG. 4E. The fluid drain mode may have a corresponding configuration. The configuration may be associated with a configuration of the trailer 26 and/or the vehicle body 12. The configuration can be stored on memory 30, in the trailer mode selection module 32, etc. The configuration can be stored as associated with the fluid drain mode. In one or more arrangements, where the configuration is for the trailer 26, the configuration can be, for example, where the attachment end 38 of the trailer 26 is located substantially above the loading end 40. Additionally or alternatively, the configuration can be, for example, where the support surface 44 has the largest possible rearward pitch with respect to the loading end 40. In one or more arrangements, where the configuration is for the vehicle body 12, the configuration can be, for example, where the rear end 14b is positioned substantially above (e.g., substantially elevated with respect to) the front end 14a.

Responsive to receiving a selection of the fluid drain mode, the processor(s) 28 can determine one or more features about the trailer 26. In one or more arrangements, the processor(s) 28 can determine whether the trailer 26 has been attached, the current attitude for the support surface 44 of the trailer 26 and/or the current attitude of the vehicle body 12. In one or more arrangements, the processor(s) 28 can determine the direction of hitch movement needed to achieve the configuration associated with the fluid drain mode. This can be done, for example, by comparing the current attitude for vehicle body 12 and/or the support surface 44 with the configuration associated with the fluid drain mode, and determining the difference between the current attitude and the trailer fluid drain mode configuration.

Responsive to determining the direction of hitch movement, the processor(s) 28 can control the active suspension system 18 to change the attitude of the vehicle body 12 to produce the required hitch movement. As a result, the attitude of the support surface 44 is changed. To change the attitude of the vehicle body 12, in one or more arrangements, the processor(s) 28 can actuate at least one active component 23 for one or more of the front wheels 16a, 16c and rear wheels 16b, 16d on either side of the vehicle body 12 to change a distance between one or more of the wheel(s) and the vehicle body 12. Changing the attitude of the vehicle body 12 in this manner causes the hitch point between the trailer hitch 24 and the attachment end 38 of the trailer 26 to be displaced from a first position to a second position.

In one or more arrangements, the front end 14a of the vehicle body 12 may be lowered, and/or the rear end 14b of the vehicle body 12 may be raised. This causes the trailer hitch 24 to be displaced from a lowered position to a raised position. As a result, the attitude of the trailer 26 is changed at the loading end 40. In this example, at least the pitch of the trailer 26 is changed, so that the trailer has a rearward pitch. Therefore, the water from the boat 27 may flow off the boat 27 and down the trailer 26. In this mode, the vehicle 10 is manipulated in a manner similar to the trailer load/unload mode shown in FIG. 4B.

In one or more arrangements, the processor(s) 28 can control the active suspension system 18 to achieve an attitude of the vehicle body 12 that results in the attached trailer support surface 44 having the largest possible rearward pitch. This can include, for example, actuating the active components 23 for the rear wheels 16b, 16d in the active suspension system 18 to achieve the maximum allowable distance between the wheels and the vehicle body 12. Thus, the processor(s) 28 can actuate the at least one active component 23 in the active suspension system to change the attitude (e.g., at least pitch and/or roll) of the vehicle body 12 and, as a result, cause at least the pitch of the trailer support surface 44 to be changed to achieve the maximum rearward pitch. This can include, for example, providing the greatest elevation of the attachment end 38 with respect to the loading end 40 of the trailer 26.

In FIG. 4F, the vehicle 10 is in a trailer attachment mode. In the trailer attachment mode, the user may desire to attach a trailer 26 to the trailer hitch 24. Typically, the user would have to lift the attachment end 38 above the trailer hitch 24 to attach the trailer 26 to the trailer hitch 24.

To attach the trailer 26 to the trailer hitch 24 without having to lift the attachment end 38, the user may select, via the user interface 33, the trailer attachment mode shown in FIG. 4F. The trailer attachment mode may have a corresponding configuration. The configuration may be associated with a configuration of the vehicle body 12 with respect to the trailer 26. The configuration can be stored on memory 30, in the trailer mode selection module 32, etc. The configuration can be stored as associated with trailer attachment mode. In one or more arrangements, the configuration can be, for example, where the trailer hitch 24 is positioned subjacent to the attachment end 38. For example, the configuration can be where the trailer hitch 24 is positioned anywhere between the ground surface and the attachment end 38.

Responsive to receiving a selection of the trailer attachment mode, the processor(s) 28 can determine one or more features about the trailer 26. In one or more arrangements, the processor(s) 28 can determine the location of the attachment end 38 of the trailer 26. In one or more arrangements, the processor(s) 28 can determine the direction of hitch movement needed to achieve the configuration associated with the trailer attachment mode. This can be done, for example, by comparing the location of the attachment end 38 of the trailer 26 with the current location of the trailer hitch 24, and determining the difference between the these locations.

Responsive to determining the direction of hitch movement, the processor(s) 28 can control the active suspension system 18 to change the attitude of the vehicle body 12 to produce the required hitch movement. As a result, the pitch of the vehicle body 12 may be changed to raise the front end 14a of the vehicle body 12, and/or lower the rear end 14b of the vehicle body 12. This causes the trailer hitch 24 to be displaced from a first position to a second position. As a result, the trailer 26 may be easier to attach to the trailer hitch 24, since a user may not need to lift the attachment end 38 of the trailer 26 as much to attach to the attachment end 38 to the trailer hitch 24.

In one or more arrangements, the processor(s) 28 can control the active suspension system 18 to achieve an attitude of the vehicle body 12 that results in the attached trailer 26 being easier to attach. Although described as an attachment mode, it should be understood that the same mode can be used to detach the trailer 26 from the vehicle body 12.

In one or more arrangements, the processor(s) 28 can actuate the at least one active component 23 in the active suspension system 18 to cause the vehicle rear end 14b to be tipped down to where the distance between the vehicle body 12 and rear wheels 16b is smallest, and to progressively tip the rear end 14b back up to normal (e.g., increase the distance between the vehicle body 12 and rear wheels 16b until the trailer hitch is at a normal usage height above ground for the vehicle). Additionally or alternatively, the processor(s) 28 can actuate the at least one active component 23 in the active suspension system 18 to cause the rear end 14 to slightly tip down (e.g., to slightly decrease the distance between the rear wheels 16b, 16d and vehicle body 12). Both of these examples may permit a user to attach a trailer 26 without having to lift the attachment end 38 of the trailer 26 onto the trailer hitch 24. Thus, in trailer attachment mode shown in FIG. 4F, the trailer hitch 24 can be positioned subjacent the attachment end 38 of the trailer 26. In one or more arrangements, the trailer hitch 24 can be positioned between the attachment end 38 of the trailer 26 and the ground surface.

In FIG. 4G, the vehicle 10 is in tire change mode. In the tire change mode, there may be a flat tire 36a on the trailer 26. To change the flat tire 36a, the user typically would need to raise the side of the trailer adjacent the flat tire 36a using, for example, a jack.

To change a flat tire 36a on the trailer 26, the user may select, via the user interface 33, the tire change mode shown in FIG. 4G. The tire change mode may have a corresponding configuration. The configuration may be associated with a configuration of the trailer 26. In one or more arrangements, the configuration may be a function of which tire is flat, and various features of the trailer 26. The configuration can be stored on memory 30, in the trailer mode selection module 32, etc. The configuration can be stored as associated with the tire change mode. In one or more arrangements, the configuration can be, for example, where the side of the trailer 26 adjacent a flat tire is raised with respect to the opposite side of the trailer 26, or where the side of the trailer on which the tire is flat is raised until the flat tire is spaced apart from road surface.

Responsive to receiving a selection of the tire change mode, the processor(s) 28 can determine one or more features about the trailer 26. In one or more arrangements, the processor(s) 28 can determine whether the trailer 26 has been attached, the current support surface attitude and/or the tire arrangement for the attached trailer 26. In one or more arrangements, the tire arrangement for the attached trailer 26 can include, for example, the location and number of tires, the location of the flat tire, etc.

In one or more arrangements, the processor(s) 28 can determine the direction of hitch movement needed to achieve the configuration associated with the tire change mode. This can be done, for example, by determining which tire is flat, and comparing the current support surface attitude to the configuration associated with the tire change mode.

Responsive to determining the direction of hitch movement, the processor(s) 28 can control the active suspension system 18 to change the attitude of the vehicle body 12 to produce the required hitch movement. As a result, the attitude of the vehicle body 12 may be changed. Depending on which tire 36 is flat, and how many tires are supporting the trailer 26, the attitude of the attached trailer 26 is changed to lift the flat tire 36a off the ground by changing the attitude of the vehicle body 12. For example, where the trailer 26 is a single axle trailer and one tire is flat, the side of the vehicle body 12 opposite the flat tire 36a can be lowered and/or the side of the vehicle body 12 that the flat tire 36a is located along can be raised. By lowering the side of the vehicle body 12 opposite the flat tire 36a and/or raising the side of the vehicle body 12 that the 36a is located along, the attitude of the vehicle body 12 (in this example, the roll) is changed. As a result, the trailer 26 is tipped along its side, and the flat tire may be lifted off the ground. If the connection between the hitch and the trailer is not structured such that a rotation of the vehicle about the roll axis R-R will be transferred to the trailer, the active component(s) 23 for the vehicle rear wheels 16b, 16d in the active suspension system 18 may be actuated to raise the rear end of the vehicle to its maximum allowable height. This creates the largest possible distance d between the rear wheels 16b and vehicle body 12. If the loading end of the trailer is able to contact the road surface as the distances between the rear wheels and the vehicle body are maximized or increased as just described, the flat tire 36a may be lifted off the ground by raising the vehicle rear end. Thus, in such a case, the processor(s) 28 can actuate the at least one active component 23 in the active suspension system 18 to change the attitude (e.g., at least pitch and/or roll) of the vehicle body 12 and, as a result, cause the flat tire 36a to be lifted off the ground.

As shown in FIG. 4G, the trailer 26 has two tires 36a, 36b on one side of the vehicle, and the first tire 36a is flat. The user can identify whether the front or rear tire 36a, 36b is flat, and which side of the trailer 26 the flat tire 36a is on. In one or more arrangements, the processor(s) 28 can control the active suspension system 18 to achieve an attitude of the vehicle body 12 that results in the attached trailer support surface 44 having an attitude where the flat tire 36a is lifted off the road surface. This can include, for example, actuating the active component(s) 23 for the vehicle rear wheels 16b, 16d in the active suspension system 18 to raise the rear end of the vehicle to its maximum allowable height. This creates the largest possible distance d between the rear wheel 16b and vehicle body 12. Thus, the processor(s) 28 can actuate the at least one active component 23 in the active suspension system 18 to change the attitude (e.g., at least pitch and/or roll) of the vehicle body 12 and, as a result, cause the flat tire 36a to be lifted off the ground. Additionally or alternatively, the processor(s) 28 can actuate at least one active component 23 in the active suspension system 18 to increase the distance between front and rear wheels 16a, b on the first side 14c of the vehicle body from the vehicle body, resulting in a roll of the trailer toward the side of the vehicle opposite the lifted side. This may result in both tires 36a, b being lifted.

Although these two examples are shown, the processor(s) 28 can actuate at least one active component 23 in the active suspension system 18 in many different ways to cause a flat tire 36a to be lifted off the ground. As such, the present disclosure should not be limited to these two examples.

Although these various examples of trailer modes have been shown and described, there can be many additional trailer modes. As such, the present disclosure should not be limited to these trailer modes. For example, there can be a manual trailer mode. In this mode, the user manually selects a distance between one or more of the wheels 16a-d and the vehicle body 12. In this example, the user can achieve a desired result for the attitude of the support surface and/or the ramp of the trailer 26 through selective actuation of the one or more active components 23 in the active suspension system 18 of the vehicle 10.

Figure 5:
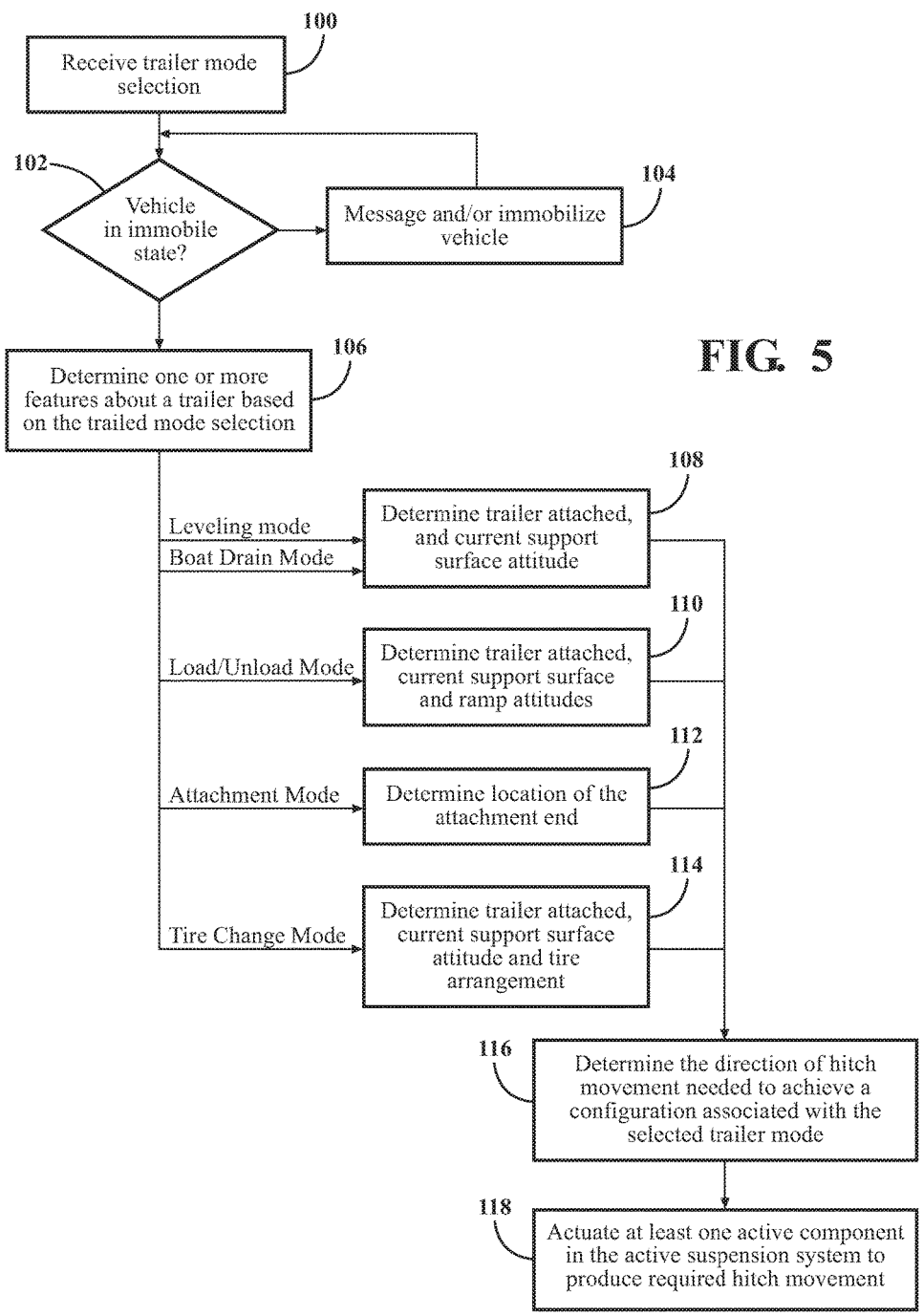
FIG. 5 is method of modifying an attitude of a vehicle body.

Now that the various potential systems, devices, elements and/or components of the vehicle 10 have been described, various methods will now be described. Referring now to FIG. 5, an example of a method of modifying an attitude of the vehicle body 12 is shown. The method can begin at function block 100.

At function block 100, the one or more processor(s) 28 can receive a selection from a user, via the user interface 33, indicating a selection of a trailer mode. As stated above, the trailer mode selection module 32 can include a plurality of trailer modes. The trailer modes can include, for example, the trailer tow mode shown in FIG. 4A, the trailer load/unload mode shown in FIG. 4B, the trailer leveling mode shown in FIGS. 4C-4D, the fluid drain mode shown in FIG. 4E, the trailer attachment mode shown in FIG. 4F, and the tire change mode shown in FIG. 4G. Additionally or alternatively, the trailer mode selection module 32 can include other modes including, for example, a manual mode. The user can select one of these exemplary modes via the user interface 33.

In one or more arrangements, where the user selects manual mode, the one or more processor(s) 28 can proceed directly to function block 118 to actuate at least one active component 23 in the active suspension system 18 based on the manual mode selection. In this example, the manual mode can include receiving manual actuation of at least one active component 23 in the active suspension system 18, and, at function block 118, the processor(s) 28 can actuate the at least one active component 23 in the active suspension system 18 based on the user's manual inputs. The at least one active component 23 can be actuated in steps, to extremes (e.g., maximum/minimum actuation), etc. responsive to the manual inputs. The manual inputs can be associated with a configuration of the vehicle 10 and/or attached trailer 26. The processor(s) 28 can actuate the at least one active component 23 in the active suspension system 18 of the vehicle 10 to control the distance between the vehicle body 12 and one or more wheels 16 of the vehicle 10 so as to change the attitude of the vehicle body 12, and thereby cause the attached trailer 26 and/or vehicle 10 to have the configuration associated with the manual inputs.

In one or more arrangements, responsive to receiving a trailer mode selection, the one or more processor(s) 28 can proceed to function block 102. At function block 102, the one or more processor(s) 28 can determine whether the vehicle 10 is in an immobile state. In one or more arrangements, the processor(s) 28 can determine whether the vehicle is in an immobile state for certain trailer modes. For example, in the trailer tow mode, the vehicle 10 may not need to be in an immobile state (since the trailer 26 is being towed), whereas in the trailer load/unload mode, the trailer leveling mode, fluid drain mode, attachment mode, tire change mode, etc., the vehicle may need to be in an immobile state. Data corresponding to whether the vehicle 10 may need to be in an immobile state for a particular trailer mode can be stored (e.g., in memory 30, trailer mode selection module 32, etc.) corresponding to each particular trailer mode.

In one or more arrangements, the processor(s) 28 can determine the vehicle 10 is in an immobile state by, for example, detecting the current state of the transmission (e.g., whether the vehicle 10 is in park, drive, neutral, etc.), and/or detecting movement by one or more sensors 34 on the vehicle 10 (e.g., tachometer, IMU, etc.). If a user attempts to select a trailer mode while the vehicle is moving, the method may proceed to function block 104. At function block 104, the one or more processor(s) 28 can generate an error message informing the user that the vehicle must be stationary for a selected trailer mode to be implemented. In another example, the processor(s) can automatically place the vehicle in an immobile state. This can include, for example, automatically shifting the vehicle to park, neutral, etc., automatically activating the emergency brake, etc. The method can loop back to function block 102 until the vehicle 10 is in an immobile state. When the vehicle 10 is in an immobile state, the method can continue to function block 106.

At function block 106, the one or more processor(s) 28 can determine one or more features about a trailer based on the trailer mode selection by the user. The one or more features can include, for example, static and dynamic features.

The static features can include fixed measurements about the trailer 26 that do not change with time. In one or more arrangements, the static features can include trailer specifications (e.g., dimensions, layout, number of axles, location of axles, etc.). The static features can be manually input, via the user interface 33, by the user and stored in memory 30. Additionally or alternatively, the user can indicate identifying information for the trailer 26 (e.g., make/model, serial number, etc.) and the processor(s) 28 can access a database including the static features for the identified trailer 26. In one or more arrangements, the database can be stored locally in memory 30, for example. In another example, the database can be stored remotely and accessed via a communications protocol in the vehicle 10.

The dynamic features can include one or more measurements or features about the trailer that may change with time, location and/or orientation of the trailer 26. In one or more arrangements, the dynamic features can include, for example, whether the trailer 26 has been attached to the trailer hitch 24, a current support surface attitude for the trailer 26, a current ramp attitude for the trailer 26, a location of one or more points or ends of the trailer 26 with respect to the vehicle 10, etc. In one or more arrangements, the dynamic features can be detected via sensor(s) 34. The sensor(s) 34 can be positioned on the vehicle body 12 and/or the trailer 26 and be in communication with the processor(s) 28. The sensors(s) 34 can include, for example, a camera, LIDAR, Radar, a gyroscope, inclinometer, magnetic field sensor, IMU, etc.

Where the processor(s) 28 determine whether the trailer 26 has been attached to the trailer hitch 24, the processor(s) 28 can make this determination by, for example, a backup camera sensor, radar sensor, LIDAR sensor, contact sensor on the trailer hitch 24, etc. Additionally or alternatively, the processor(s) 28 can assume the trailer 26 has been attached responsive to receiving a trailer mode selection from a user. Where the trailer 26 has not been attached, the one or more processor(s) 28 can prompt the user, via the user interface 33, to properly attach the trailer 26 to the trailer hitch 24. In one or more arrangements, the dynamic features can be manually input by the user via the user interface 33.

In one or more arrangements, the features determined by the processor(s) 28 in function block 106 can be based on the trailer mode selection. In one or more arrangements, each trailer mode stored on the trailer mode selection module 32 may have at least one corresponding feature that is determined by the processor(s) 28. The corresponding feature determined for each trailer mode can be used by the processor(s) 28 to determine the direction of hitch movement needed to achieve a configuration associated with the selected trailer mode.

For example, in the trailer leveling mode shown in FIGS. 4C-4D, the processor(s) 28 may determine, at function block 108, whether the trailer 26 has been attached to the trailer hitch 24, and/or the current support surface attitude for the trailer 26. Likewise, in the fluid drain mode shown in FIG. 4E, the processor(s) 28 may determine, at function block 108, whether the trailer 26 has been attached to the trailer hitch 24, and/or the current support surface attitude for the trailer 26. Additionally, in the trailer load/unload mode shown in FIG. 4B, the processor(s) 28 may determine, at function block 110, whether the trailer 26 has been attached to the trailer hitch 24, the current support surface attitude and/or the current ramp attitude. Additionally, in the trailer attachment mode shown in FIG. 4F, the processor(s) 28 may determine, at function block 112, the location of at least one point or end of the trailer 26. In one or more arrangements, the point or end can include, for example, the attachment end 38 of the trailer 26. The location may be expressed as a height above the road surface, for example. Additionally, in the tire change mode shown in FIG. 4G, the processors may determine, at function block 114, whether the trailer 26 has been attached to the trailer hitch 24, the current support surface attitude for the trailer 26, and/or the tire arrangement for the trailer 26. In one or more arrangements, the tire arrangement can include, for example, the number and location of the tires, the location of the flat tire, other pertinent dimensions of the trailer, etc. While particular features are described as corresponding to these trailer modes, it should be understood that the trailer modes are not necessarily limited to the described features. To the contrary, the trailer modes may include some of the described corresponding features, additional features, and/or alternative features.

Responsive to determining the one or more features about the trailer based on the trailer mode selection, the method can continue to function block 116.

At function block 116, the processor(s) 28 can determine the direction of hitch movement needed to achieve a configuration associated with the selected trailer mode. In one or more arrangements, each trailer mode may have a corresponding vehicle body and/or trailer configuration. The configurations can be stored, for example, on memory 30, the trailer mode selection module 32, etc., as corresponding to each trailer mode. The processor(s) 28 can determine the direction of hitch movement needed to achieve the various configurations by, for example, comparing one or more dynamic features for the trailer 26 and/or vehicle 10 to the configuration associated with the selected trailer mode from function block 100. Responsive to determining the direction of hitch movement, the method can continue to function block 118.

At function block 118, the processor(s) 28 can actuate at least one active component 23 in the active suspension system 18 to produce the required hitch movement. As a result, the attitude of the vehicle body 12 and/or one or more surfaces of the trailer 26 (e.g., support surface 44, ramp 42) are changed. The processor(s) 28 can actuate at least one active component 23 in the active suspension system 18 to at least change the pitch and/or roll of the vehicle body 12. To change the pitch of the vehicle body 12, in one or more arrangements, the processor(s) 28 can actuate at least one active component 23 for the rear wheels 16b, 16d to change a distance d1 between the rear wheels 16b, 16d and the vehicle body 12. Additionally or alternatively, the processor(s) 28 can actuate at least one active component 23 for the front wheels 16a, 16c to change a distance d2 between the front wheels 16a, 16c and the vehicle body 12. Changing the distance d1 between the rear wheels 16b, 16d and the vehicle body 12 and/or changing a distance d2 between the front wheels 16a, 16c and the vehicle body 12 both cause at least the pitch of the vehicle body 12 to change. To change the roll of the vehicle body 12, in one or more arrangements, the processor(s) 28 can actuate at least one active component 23 for one of the rear wheels 16b, 16d to change a distance d1 between one of the rear wheels 16b, 16d and the vehicle body 12. Additionally or alternatively, the processor(s) 28 can actuate at least one active component 23 for the front wheel 16a to change a distance d2 between one of the front wheels 16a, 16c and the vehicle body 12. Changing the distance d1 between one of the rear wheels 16b, 16d and the vehicle body 12 and/or changing a distance d2 between one of the front wheels 16a, 16c and the vehicle body 12 both cause at least the roll of the vehicle body 12 to change. Changing the pitch and/or roll of the vehicle body 12 in this manner causes the trailer hitch 24 to move from the current configuration to a target configuration. The target configuration can be a configuration needed to achieve the configuration associated with the selected trailer mode. The target configuration can be determined by function block 116.

Responsive to the step performed in function block 118, in one or more arrangements, the processor(s) 28 can determine whether the vehicle body 12 and/or the trailer 26 have the configuration associated with the selected trailer mode of function block 100. Responsive to the vehicle body 12 and/or the trailer 26 having the configuration associated with the selected trailer mode, the processor(s) 28 can stop actuating the one or more active components 23 of the active suspension system 18. Responsive to the vehicle body 12 and/or the trailer 26 not having the configuration, the processor(s) 28 can determine whether the one or more active components 23 can continue to be actuated (e.g., whether the one or more active components 23 are at their maximum allowable respective actuations, whether an end of the vehicle body 12 is touching the ground, whether an end of the trailer 26 is touching the ground, etc.). If the processor(s) 28 determine that the one or more active components 23 can continue to be actuated, the method can continue back to function block 118. However, where the processor(s) 28 determine that the one or more active components 23 cannot continue to be actuated, the processor(s) 28 can stop actuating the one or more active components 23 of the active suspension system 18.

In one or more arrangements, when the user no longer wants the trailer 26 to be in a previously selected mode, the user can select a different mode. In one or more arrangements, the user can change the state of the vehicle 10 from an immobile state to a mobile state. In this example, the user can, for example, start the engine, shift out of park or neutral, disengage the emergency brake, etc. Responsive to the vehicle 10 changing from an immobile state to a mobile state, the processor(s) 28 can automatically change from one trailer mode to another trailer mode. For example, the processor(s) 28 can automatically change from the present trailer mode to the default trailer mode (e.g., the trailer tow mode).

The method illustrated in FIG. 5 may be applicable to the arrangements described above in relation to FIGS. 1-4G, but it is understood that these methods can be carried out with other suitable systems and arrangements. Moreover, the method may include other steps that are not shown here. In fact, the method is not limited to including every step shown in FIG. 5. The steps that are illustrated as part of the method are not limited to the particular chronological order shown in FIG. 5. Indeed, some of the steps may be performed in a different order than what is shown and/or at least some of the steps shown can occur simultaneously.

It will be appreciated that arrangements described herein can provide numerous benefits, including one or more of the benefits mentioned herein. For example, arrangements described herein can optimize the breakover angle $\theta_B$ between the support surface 44 of the trailer 26 and the ramp 42. Arrangements described herein can change the attitude of the trailer 26 without requiring additional components on the trailer 26, thus potentially decreasing cost. Arrangements described herein can change the attitude of the vehicle body 12 to produce a desired effect depending on the needs of the user, without incurring additional cost.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the method may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device. The computer-readable storage medium may be embodied, for example, in memory 30 previously described.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An attitude modification system in a vehicle having a trailer attached thereto, the system comprising:
   an active suspension system connected to a body of the vehicle, the active suspension system including at least one active component structured for controlling a distance between the vehicle body and a wheel of the vehicle so as to change an attitude of the vehicle body;
   one or more processors operatively connected to the active suspension system; and
   a memory operatively connected to the one or more processors for storing data and program instructions usable by the one or more processors, wherein the one or more processors are configured to execute instructions stored in the memory to:
   receive a selection of a trailer mode;
   receive one or more commands in accordance with the selected trailer mode; and
   actuate the at least one active component in the active suspension system of the vehicle to control the distance between the vehicle body and the wheel of the vehicle so as to change the attitude of the vehicle body, so as to change the configuration of the attached trailer.

2. The attitude modification system of claim 1, wherein the one or more processors are configured to execute instructions stored in the memory to, prior to actuation of the at least one active component, determine a current breakover angle of the attached trailer.

3. The attitude modification system of claim 2, wherein the trailer mode has a target breakover angle associated therewith, and wherein the one or more processors are configured to execute instructions stored in the memory to actuate the at least one active component in the active suspension system to change the attitude of the vehicle body so as to change the breakover angle of the attached trailer from the current breakover angle to the target break over angle associated with the trailer mode.

4. The attitude modification system of claim 1 wherein:
   at least one front wheel is coupled, via the active suspension system, to a front end of the vehicle body; and
   at least one rear wheel is coupled, via the active suspension system, to a rear end of the vehicle body, wherein the active suspension system includes at least a first active component structured for controlling a distance between the vehicle body and the at least one front wheel and at least a second active component structured for controlling a distance between the vehicle body and the at least one rear wheel.

5. The attitude modification system of claim 4, wherein the one or more processors are configured to execute instructions stored in the memory to:
actuate the at least a first active component in the active suspension system to change a distance between the at least one front wheel and the vehicle body; and
actuate the at least a second active component in the active suspension system to change a distance between the at least one rear wheel and the vehicle body.

6. The attitude modification system of claim 1, further comprising:
at least one rear wheel coupled, via the active suspension system, to the vehicle proximate a rear end of the vehicle body, and wherein the one or more processors are configured to execute instructions stored in the memory to actuate the at least one active component in the active suspension system to change the attitude of the vehicle body so as to change the configuration of the attached trailer by actuating the at least one active component to change a distance between the at least one rear wheel and the vehicle body.

7. The attitude modification system of claim 1, further comprising:
at least one front wheel connected, via the active suspension system, proximate a front end of the vehicle body, wherein the at least one active component is structured for controlling a distance between the vehicle body and the at least one front wheel, and wherein the one or more processors are configured to execute instructions stored in the memory to actuate the at least one active component in the active suspension system to change the attitude of the vehicle body so as to change the configuration of the attached trailer by actuating the at least one active component to change a distance between the at least one front wheel and the vehicle body.

8. The attitude modification system of claim 1, further comprising:
a trailer hitch attached to an end of the vehicle body, wherein the one or more processors are configured to execute instructions stored in the memory to actuate the at least one active component in the active suspension system to change the attitude of the vehicle body so as to change the configuration of the attached trailer by actuating the at least one active component to cause the trailer hitch to be positioned in a location which causes the configuration of the attached trailer to match the target configuration.

9. The attitude modification system of claim 1, wherein the trailer is attached to a first end of the vehicle body, and wherein the one or more processors are configured to execute instructions stored in the memory to actuate the at least one active component in the active suspension system to change the attitude of the vehicle body so as to change the configuration of the attached trailer by actuating the at least one active component to change a pitch of the vehicle body.

10. An attitude modification system in a vehicle in an immobile state, comprising:
an active suspension system including at least one active component for controlling a distance between a vehicle body and a wheel, the active suspension system being configured to change an attitude of the vehicle body;
a trailer hitch structured to enable attachment of a trailer thereto; and
a processor operatively connected to the active suspension system, the processor configured to initiate executable instructions to receive a selection of a trailer mode; and determine a target location of the trailer hitch needed to achieve a configuration associated with the selected trailer mode; and
actuate the at least one active component in the active suspension system of the vehicle to change the attitude of the vehicle body so as to cause the trailer hitch to have the target location.

11. The attitude modification system of claim 10, wherein the trailer mode selection indicates a selection of a trailer leveling mode wherein the configuration of the trailer includes a support surface of the trailer being substantially level.

12. The attitude modification system of claim 10, wherein the trailer mode selection indicates a selection of a trailer load/unload mode and wherein the configuration of the trailer includes an attachment end of the trailer being elevated with respect to a loading end of the trailer.

13. The attitude modification system of claim 10, further comprising:
at least one sensor for detecting a breakover angle for an attached trailer, wherein
a corresponding a target breakover angle for the attached trailer is associated with the configuration associated with the selected trailer mode, further wherein the one or more processors are configured to actuate the at least one active component in the active suspension system of the vehicle to change the attitude of the vehicle body so as to cause the trailer hitch to have a location such that the breakover angle of the attached trailer substantially matches the target breakover angle associated with the trailer mode selection.

14. The attitude modification system of claim 10, wherein the one or more processors are configured to execute instructions to receive, from at least one sensor, information describing a current trailer configuration of a trailer attached to the trailer hitch at a hitch point, and wherein the one or more processors are configured to actuate the at least one active component in the active suspension system of the vehicle to change the attitude of the vehicle body so as to move the trailer hitch to a target location which will cause the trailer to have a target configuration associated with the received trailer mode selection.

15. A method of modifying an attitude of a vehicle in an immobile state, the method comprising steps of:
receiving a selection of a trailer mode associated with a corresponding configuration;
determining one or more features about a trailer based on the selected trailer mode;
determining a location of a trailer hitch needed to achieve the configuration corresponding to the selected trailer mode, the location being based on the one or more features about the trailer; and
actuating at least one active component in an active suspension system of the vehicle to change an attitude of the vehicle body so as to cause the trailer hitch to be located in the determined location, thereby causing the vehicle body to be in the selected trailer mode.

16. The method of claim 15, wherein the selected trailer mode is any one of a fluid drain mode and a trailer load/unload mode, and wherein the step of actuating the at least one active component in the active suspension system of the vehicle to change the attitude of the vehicle body so as to cause a trailer hitch to be located in the determined location thereby causing the vehicle body to be in the selected trailer mode comprises actuating the at least one active component to change the attitude of the vehicle body so as to cause a first end of the trailer to be elevated with respect to a second end of the trailer.

17. The method of claim 15, wherein the selected trailer mode is a trailer leveling mode, and wherein the step of actuating the at least one active component in the active suspension system of the vehicle to change the attitude of the vehicle body so as to cause a trailer hitch to be located in the determined location thereby causing the vehicle body to be in the selected trailer mode comprises actuating the at least one active component in the active suspension system of the vehicle to change the attitude of the vehicle body so as to cause a support surface of the trailer to be substantially level.

18. The method of claim 15, wherein the selected trailer mode is a trailer attachment mode, and wherein the step of actuating the at least one active component in the active suspension system of the vehicle to change the attitude of the vehicle body so as to cause a trailer hitch to be located in the determined location thereby causing the vehicle body to be in the selected trailer mode comprises actuating the at least one active component in the active suspension system of the vehicle to change at least the attitude of the vehicle body so as to cause the trailer hitch to be positioned subjacent an attachment end of the trailer.

19. The method of claim 15, wherein the selected trailer mode is a tire change mode, and wherein the step of actuating the at least one active component in the active suspension system of the vehicle to change the attitude of the vehicle so as to cause a trailer hitch to be located in the determined location thereby causing the vehicle body to be in the selected trailer mode comprises actuating the at least one active component in the active suspension system of the vehicle to change the attitude of the vehicle body so as to cause a first tire on the attached trailer to be spaced apart from a road surface on which the trailer is positioned.

20. The method of claim 15, further comprising:
determining a current breakover angle for the trailer, and wherein the step of actuating the at least one active component in the active suspension system of the vehicle to change the attitude of the vehicle body so as to cause a trailer hitch to be located in the determined location thereby causing the vehicle body to be in the selected trailer mode comprises actuating the at least one active component in the active suspension system to change an attitude of the vehicle body so as to cause the breakover angle for the trailer to change from the current breakover angle to a target breakover angle associated with the selected trailer mode.

\* \* \* \* \*